(12) United States Patent
Antalek et al.

(10) Patent No.: US 8,051,953 B2
(45) Date of Patent: Nov. 8, 2011

(54) HYDROGEN COOLED GENERATOR LUBRICANT DRAIN SYSTEM

(75) Inventors: James Daniel Antalek, Valatie, NY (US); Jeffrey James Andritz, Altamont, NY (US); Anthony James George, Clifton Park, NY (US); Hans Knuijt, Niskayuna, NY (US); Abby Magro, West Hartford, CT (US); Kevin Jon O'Dell, Rensselaer, NY (US); Fotios Raftelis, Albany, NY (US); Steven Paul Scarlata, Wynantskill, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/651,609

(22) Filed: Jan. 4, 2010

(65) Prior Publication Data

US 2011/0163018 A1    Jul. 7, 2011

(51) Int. Cl.
*F01M 1/10* (2006.01)
*F01M 11/00* (2006.01)

(52) U.S. Cl. .................................. 184/6.24; 184/6.28
(58) Field of Classification Search ............ 184/6.4, 184/6.11, 6.21, 6.22, 7.4, 6.28; 277/304, 277/320
See application file for complete search history.

(56) References Cited

U.S. PATENT DOCUMENTS

| | | | |
|---|---|---|---|
| 3,688,872 A | | 9/1972 | Wagner |
| 3,976,165 A | * | 8/1976 | Pilarczyk ..................... 184/6.16 |
| 4,058,320 A | | 11/1977 | Kosanovich |
| 4,390,082 A | * | 6/1983 | Swearingen ................... 184/6.4 |
| 4,495,035 A | * | 1/1985 | Swearingen .................... 203/23 |
| 5,176,174 A | * | 1/1993 | Toraason et al. .............. 137/590 |
| 5,186,277 A | | 2/1993 | Snuttjer et al. |
| 5,906,374 A | * | 5/1999 | Arbuckle ...................... 277/304 |
| 7,367,427 B2 | * | 5/2008 | Gaines et al. ................ 184/6.11 |

FOREIGN PATENT DOCUMENTS

| | | |
|---|---|---|
| JP | 55063548 A | 5/1980 |
| JP | 57062755 A | 4/1982 |

OTHER PUBLICATIONS

GB Search Report issued Apr. 19, 2011 in connection with corresponding GB Application No. GB1021481.5.

* cited by examiner

*Primary Examiner* — Michael Mansen
*Assistant Examiner* — Robert Reese
(74) *Attorney, Agent, or Firm* — Cantor Colburn LLP

(57) ABSTRACT

A hydrogen cooled generator includes a lubricant drain system. The lubricant drain system includes a hydrogen detraining tank having a hollow interior portion. A sensor is operatively mounted in the hydrogen detraining tank. The sensor is configured and disposed to detect an interface zone between an amount of lubricant and an amount of hydrogen gas in the hollow interior portion. A drain line is fluidly coupled to the hydrogen detraining tank. The drain line includes a first end portion that is exposed in the hollow interior portion and a second end portion. A valve is mounted in the drain line. A controller is operatively connected to the sensor and the valve. The controller is configured to selectively open the valve allowing a portion of the amount of lubricant to flow from the hollow interior portion when the interface zone is above the first end portion of the drain line.

20 Claims, 2 Drawing Sheets

HYDROGEN COOLED GENERATOR LUBRICANT DRAIN SYSTEM

BACKGROUND OF THE INVENTION

The subject matter disclosed herein relates to the art of hydrogen cooled generators and, more particularly, to a lubricant drain system for a hydrogen cooled generator.

Hydrogen cooled generators include a seal oil or lubricant drain system that includes a detraining tank. The detraining tank allows any entrained hydrogen to escape from the lubricant. After the hydrogen is removed, the lubricant is re-introduced to the generator. In operation, the lubricant flows along rotating components of the generator and picks up hydrogen before passing into the detraining tank. In the detraining tank, the hydrogen escapes or rises from the lubricant. The lubricant accumulates and eventually flows over a standpipe and passes towards a recycling tank. Before reaching the recycling tank, the lubricant passes through a float trap. During normal operating conditions, when lubricant pressure is above 15 psi, the float trap prevents any hydrogen that may pass with the lubricant over the standpipe from passing to the recycling tank.

During start up periods, when lubricant pressure is below 5 psi, the float trap does not function properly. During such times, a manual override system is employed. More specifically, during start up, or other periods of low operating pressure, an operator must manually operate a valve that isolates the lubricant from the recycling tank. The valve includes a sight glass that allows the operator to monitor lubricant flow. When the operator sees hydrogen (in the form of bubbles or foam) in the lubricant, the valve is adjusted to hold a level of lubricant in the sight glass. In addition to requiring manual operation, the above system allows lubricant having relatively high hydrogen levels to pass to the recycling tank. That is, while the float valve prevents gaseous hydrogen from entering the recycling tank, some hydrogen gas remains entrained in the hydrogen flowing over the standpipe. As the lubricant entering the standpipe is in contact with the hydrogen gas in the detraining tank, hydrogen levels in the lubricant remain high.

BRIEF DESCRIPTION OF THE INVENTION

According to one aspect of the invention, a hydrogen cooled generator includes a rotary member. The rotary member includes a first end having a first and a second end. At least one lubricant system is operatively associated with the rotary member. The at least one lubricant system includes a drain conduit having a first end section that extends to a second end section. The first end section is fluidly coupled to the rotary member. A hydrogen detraining tank is fluidly coupled to the second end section of the drain conduit. The hydrogen detraining tank includes a body portion having an external surface and an internal surface that defines a hollow interior portion. A sensor is operatively mounted in the hydrogen detraining tank. The sensor is configured and disposed to detect an interface zone between an amount of lubricant and an amount of hydrogen gas in the hollow interior portion. A drain line is fluidly coupled to the hydrogen detraining tank. The drain line includes a first end portion that is exposed in the hollow interior portion and a second end portion. A valve is mounted in the drain line between the first and second ends. The valve is configured to control fluid flow through the drain line. A controller is operatively connected to the sensor and the valve. The controller is configured and disposed to selectively open the valve allowing a portion of the amount of lubricant to flow from the hollow interior portion when the interface zone is above the first end portion of the drain line.

According to another aspect of the invention, a method of draining lubricant from a hydrogen cooled generator includes passing lubricant from one of a first rotary member seal and a second rotary member seal in the hydrogen cooled generator into a detraining tank, accumulating an amount of the lubricant in the hydrogen detraining tank, separating an amount of hydrogen gas from the amount of lubricant, detecting an interface zone between the amount of hydrogen gas and the amount of lubricant, and passing a portion of the amount of lubricant into a first end portion of a drain line. The first end portion of the drain line is spaced below the interface zone.

According to yet another aspect of the invention, a lubricant system for a hydrogen cooled generator includes a drain conduit having a first end section that extends to a second end section. The first end section is fluidly coupled to the hydrogen cooled generator. A hydrogen detraining tank is fluidly coupled to the second end section of the drain conduit. The hydrogen detraining tank includes a body portion having an eternal surface and an internal surface that defines a hollow interior portion. A sensor is operatively mounted in the hydrogen detraining tank. The sensor is configured and disposed to detect an interface zone between an amount of lubricant and an amount of hydrogen gas in the hollow interior portion. A drain line is fluidly coupled to the hydrogen detraining tank. The drain line includes a first end portion that is exposed in the hollow interior portion and a second end portion. A valve is mounted in the drain line between the first and second end portions. The valve is configured to control fluid flow through the drain line. A controller is operatively connected to the sensor and the valve. The controller is configured and disposed to selectively open the valve allowing a portion of the amount of lubricant to flow from the hollow interior portion when the interface zone is above the first end portion of the drain line.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
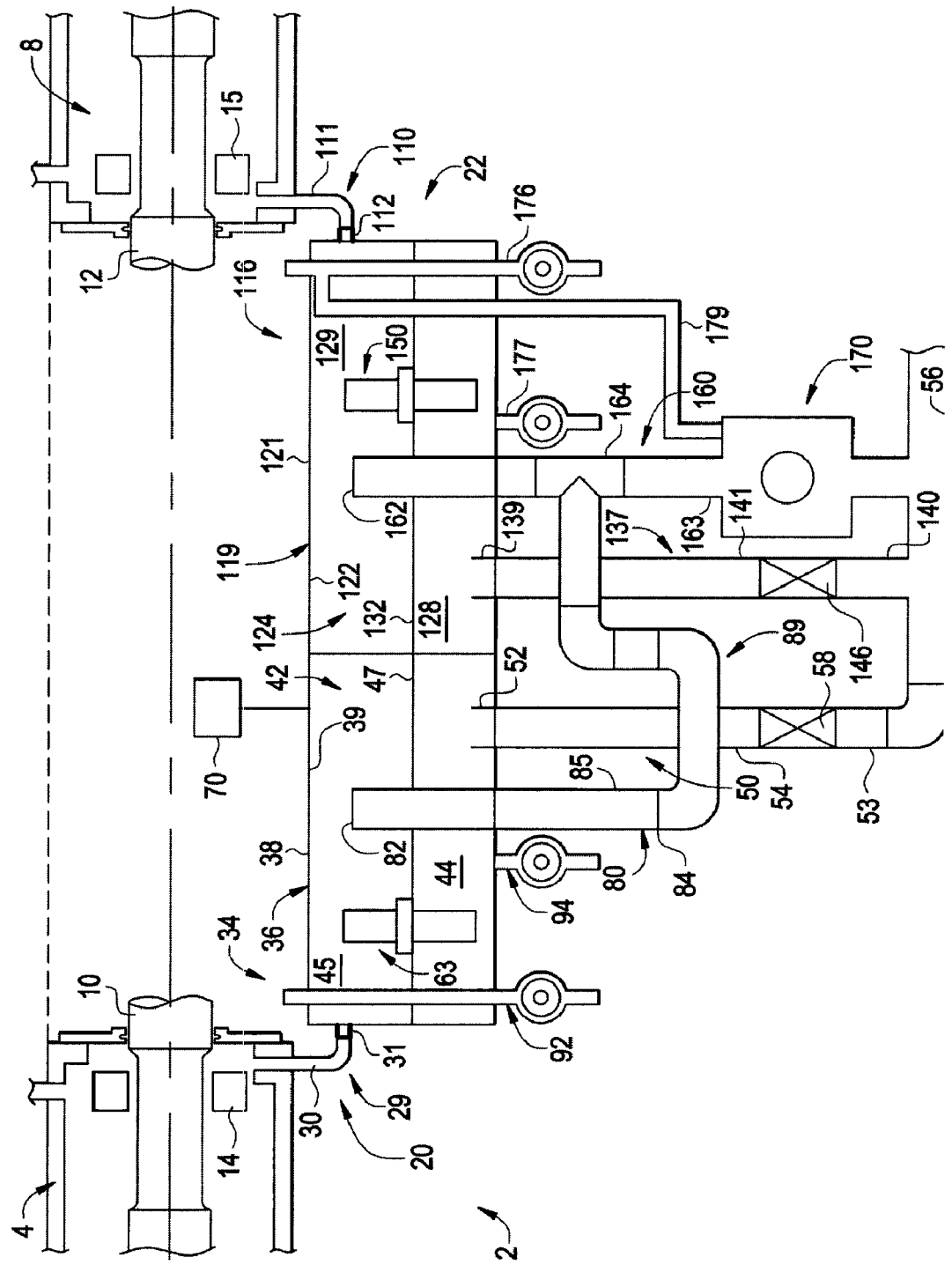
FIG. 1 is a schematic view of a hydrogen cooled generator including a lubricant drain system in accordance with an exemplary embodiment.

With reference to FIG. 1, a hydrogen cooled generator constructed in accordance with an exemplary embodiment is indicated generally at 2. Hydrogen cooled generator 2 includes a body 4 having a rotary member or rotating shaft 8 including a first or turbine end 10 and a second or collector end 12. Turbine end 10 includes a first seal 14 while collector end 12 includes a second seal 15. First and second seals 14 and 15 require lubricant such as seal oil, which is passed to a drain system in a manner that will be discussed more fully below. The seal oil prevents hydrogen gas from escaping generator 2 particularly in a region about first and second seals 14 and 15. In the exemplary embodiment shown, hydrogen cooled generator 2 includes a first drain system 20, fluidly coupled to first seal 14, and a second drain system 22 fluidly coupled to second seal 15. As shown, first drain system 20 includes a drain conduit 29 having a first end section 30 that extends to a second end section 31. First end section 30 is fluidly coupled to first seal 14 while second end section 31 is fluidly coupled to a hydrogen detraining tank 34. In a manner that will be discussed more fully below, hydrogen detraining tank 34 provides a system for removing hydrogen gas entrained within lubricant flowing through hydrogen cooled generator 2. More specifically, hydrogen that is entrained or incorporated in the seal oil is removed or allowed to escape in hydrogen detraining tank 34.

Hydrogen detraining tank 34 includes a body portion 36 having an external surface 38 and an internal surface 39 that defines a hollow interior portion 42. An amount of lubricant 44, such as seal oil and an amount of hydrogen gas is present within hollow interior portion 42. The amount of lubricant 44 is separated from the amount of hydrogen gas by an interface zone 47. A drain line 50 provides a passage for channeling a portion of the amount of lubricant 44 from hollow interior portion 42. Towards the end, drain line 50 includes a first end portion 52 that is exposed within hollow interior portion 42. First end portion 52 extends to a second end portion 53 through an intermediate portion 54. Second end portion 53 is coupled to a main drain 56 via a control valve 58. Control valve 58 is selectively activated, in a manner that will be detailed more fully below, to allow a portion of the amount of lubricant 44 to pass from hydrogen detraining tank 34.

Figure 2:
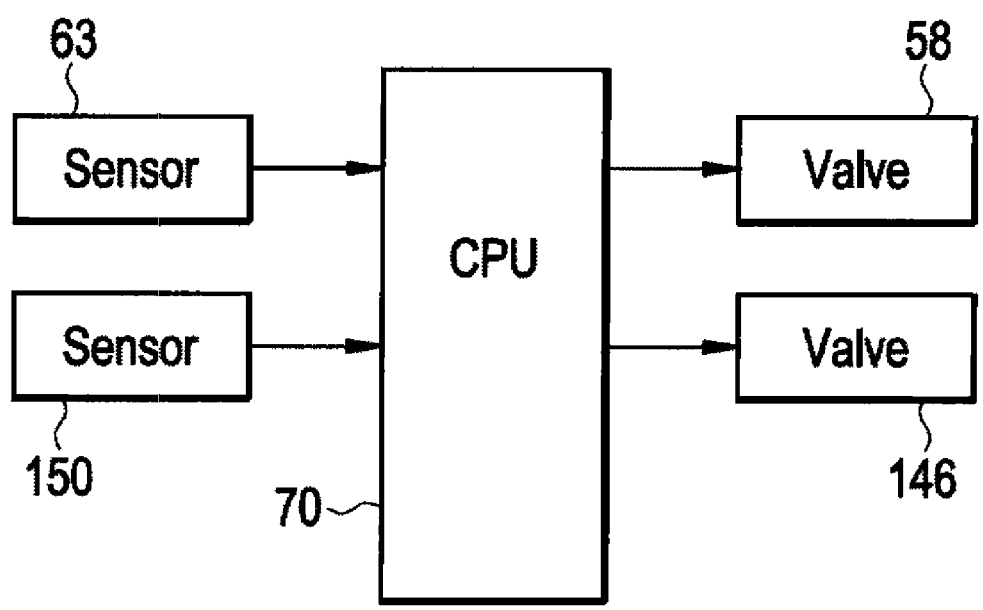
FIG. 2 is a block diagram illustrating a control for the lubricant drain system of FIG. 1.

In accordance with the exemplary embodiment, lubricant drain system includes a sensor 63 arranged within hydrogen detraining tank 34. Sensor 63, shown in the form of a fluid level transmitter, provides an indication of a position of interface zone 47 relative to first end portion 52 of drain line 50. In further accordance with the exemplary embodiment, sensor 63 is operatively coupled to a controller 70, which, as best shown in FIG. 2, is also coupled to valve 58. Controller 70 receives signals from sensor 63 indicating the position of interface zone 47 within hydrogen detraining tank 34. When sensor 63 signals that interface zone 47 is above first end portion 52, valve 58 is opened to allow a portion of the amount of lubricant 44 to flow to main drain 56. Controller 70 opens valve 58 an amount to control the release lubricant from hydrogen detraining tank 34. More specifically, sensor 63 continues monitoring the location of interface zone 47 while the lubricant is passing to main drain 56. With this arrangement, controller 70 proportionally adjusts the amount of opening of valve 58 to maintain the lubricant within hydrogen detraining tank 34 at a predetermined level.

In the event that valve 58, for whatever reason, does not open, lubricant drain system 20 includes a standpipe 80 arranged within hydrogen detraining tank 34. Standpipe 80 includes a first end 82 that extends into hollow interior portion 42 above first end portion 52. First end 82 extends to a second end 84 through an intermediate portion 85. A fluid trap 89 is provided at second end 84. With this arrangement, if the amount of lubricant 44 rises above the first predetermined distance and reaches first end 82 without sensor 63 triggering operation of valve 58, a portion of the amount of lubricant 44 will flow through standpipe 80 toward main drain 56 in a manner that will be described more fully below. In addition to drain line 50 and standpipe 80, hydrogen detraining tank 34 is also shown to include a scavenging line 92 that enables operators to withdraw a portion of the hydrogen gas 45 for analysis, as well as a manual drain 94 that enables an operator to manually drain lubricant 44 from hollow interior portion 42.

In a manner similar to that described above, second lubricant drain system 22 includes a drain conduit 110 having a first end section 111 that extends to a second end section 112. First end section 111 is fluidly coupled to second seal 15 while second end section 112 is fluidly connected to a hydrogen detraining tank 116. Hydrogen detraining tank 116 includes a body portion 119 having an external surface 121 and an internal surface 122 that defines a hollow interior portion 124. An amount of lubricant 128 and an amount of hydrogen gas 129 resides within hollow interior portion 124 and is separated by an interface zone 132. A drain line 137 provides a passage that allows a portion of the amount of lubricant 128 to pass to main drain 56. Drain line 137 includes a first end portion 139 that extends to a second end portion 140 through an intermediate portion 141. First end portion 139 extends into hollow interior portion 124 while second end portion 140 is fluidly linked to a valve 146. In a manner similar to that described above, valve 146 is selectively operated to allow a portion of the amount of lubricant 128 to pass through drain line 137 toward main drain 56.

In a manner also similar to that described above, hydrogen detraining tank 116 includes a sensor 150 that is configured and disposed to detect a position of interface zone 132 relative to first end portion 139 of drain line 137. Sensor 150 is operatively connected to controller 70 as well as valve 146. Controller 70 opens valve 146 an amount to control the release lubricant from hydrogen detraining tank 116. More specifically, sensor 150 continues monitoring the location of interface zone 132 while the lubricant is passing to main drain 56. With this arrangement, controller 70 proportionally adjusts the amount of opening of valve 146 to maintain the lubricant within hydrogen detraining tank 116 at a predetermined level.

Lubricant drain system 22 is also shown to include a standpipe 160 that is fluidly connected to hydrogen detraining tank 116. Standpipe 160 includes a first end 162 that projects into hollow interior portion 124 to a point above first end portion 139 of drain line 137. First end 162 extends to a second end 163 through an intermediate portion 164. In the embodiment shown, second end 163 is fluidly coupled to a float trap 170. In a manner similar to that described above, standpipe 160 serves as a backup to controller 70. That is, in the event that valve 146 is not opened when interface zone 132 reaches the first predetermined distance above first end portion 139, the amount of lubricant will continue to accumulate within hollow interior portion 124. Once interface zone 132 reaches first end 162, a portion of the amount of lubricant will flow into standpipe 160 towards float trap 170. Float trap 170, in a manner known in the art, prevents any gaseous hydrogen that may be passing through stand pipe 160 from reaching main drain 56. Also shown in accordance with the exemplary embodiment, fluid trap 89 is linked to intermediate portion 164 of standpipe 160. In this manner, while both first and second lubricant drain systems 20 and 22 are coupled to main drain 56, fluid trap 89 isolates hydrogen detraining tank 34 from hydrogen detraining tank 116. Finally, hydrogen detraining tank 116 is shown to include a scavenging line 176, a manual drain 177, and a vent 179 that is fluidly coupled to float trap 170.

At this point, it should be understood that the exemplary embodiments describe a system for determining an interface zone between the amount of lubricant and hydrogen gas within a hydrogen detraining tank. Once the interface zone is a predetermined level above an outlet from the detraining tank, a valve is automatically opened to allow the lubricant to pass to a main drain and, to be recycled back to hydrogen cooled generator 2. With this arrangement, lubricant is withdrawn from the hydrogen detraining tank below the interface zone. As such, the withdrawn lubricant contains substantially no hydrogen gas. That is, in contrast to current systems where the lubricant passes to the drain at the interface zone, with the lubricant still containing an amount of hydrogen, the present invention withdraws the lubricant from a position spaced well below the interface zone, such that any passing through the drain contains little if any hydrogen. At this point, it should be understood that in addition to systems having multiple hydrogen detraining tanks that are physically joined as shown, the present invention is also applicable to systems that include a single hydrogen detraining tank or hydrogen detraining tanks that are remote one from the other.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A hydrogen cooled generator comprising:
   a rotary member including a first end that extends to a second end, the rotary member being configured and disposed to be exposed to a hydrogen gas coolant; and
   at least one lubricant drain system operatively associated with the rotary member, the at least one lubricant drain system including:
      a drain conduit having a first end section that extends to a second end section, the first end section being fluidly associated with the rotary member;
      a hydrogen detraining tank fluidly coupled to the second end section of the drain conduit, the hydrogen detraining tank including a body portion having an external surface and an internal surface that defines a hollow interior portion, the hydrogen detraining tank being configured and disposed to separate hydrogen gas coolant entrained in a lubricant passing from the drain conduit;
      a sensor operatively mounted in the hydrogen detraining tank, the sensor being configured and disposed to detect an interface zone between an amount of lubricant and an amount of hydrogen gas in the hollow interior portion;
      a drain line fluidly coupled to the hydrogen detraining tank, the drain line having a first end portion that is exposed in the hollow interior portion and a second end portion;
      a valve mounted in the drain line between the first and second end portions, the valve being configured to control fluid flow through the drain line; and
      a controller operatively connected to the sensor and the valve, the controller being configured and disposed to selectively open the valve allowing a portion of the amount of lubricant to flow from the hollow interior portion when the interface zone is above the first end portion of the drain line.

2. The hydrogen cooled generator according to claim 1, wherein the sensor is a fluid level transmitter.

3. The hydrogen cooled generator according to claim 1, further comprising: a standpipe having a first end that extends to a second end, the first end extending into the hollow interior portion above the first end portion, wherein the controller selectively opens the valve when the interface zone is above the first end portion of the drain line and below the first end of the stand pipe.

4. The hydrogen cooled generator according to claim 3, further comprising: a fluid trap fluidly connected to the second end of the standpipe.

5. The hydrogen cooled generator according to claim 1, wherein the at least one lubricant drain system includes a first lubricant drain system operatively associated with the first end of the rotary member and a second lubricant drain system operatively associated with the second end of the rotary member, the first lubricant drain system including a first hydrogen detraining tank and the second lubricant drain system including a second hydrogen detraining tank.

6. The hydrogen cooled generator according to claim 5, wherein the first hydrogen detraining tank is physically joined to the second hydrogen detraining tank.

7. The hydrogen cooled generator according to claim 5, wherein the first hydrogen detraining tank includes a first stand pipe having a first end and a second end, the first end extending into the hollow interior portion above the first end portion, and the second hydrogen detraining tank includes a second stand pipe having a first end and a second end, the first end extending into the hollow interior portion above the first end portion.

8. The hydrogen cooled generator according to claim 7, wherein the first stand pipe includes a fluid trap fluidly connected to the second end and the second standpipe includes a float trap fluidly connected to the second end.

9. The hydrogen cooled generator according to claim 8, wherein the fluid trap is fluidly connected to the second standpipe upstream of the float trap.

10. A method of draining lubricant from a hydrogen cooled generator, the method comprising:
    passing lubricant from one of a first rotary member seal a second rotary member seal in the hydrogen cooled generator into a detraining tank, the first and second rotary member seals being configured and disposed to be exposed to hydrogen gas coolant;
    accumulating an amount of the lubricant in the hydrogen detraining tank;
    separating an amount of hydrogen gas coolant from the amount of lubricant;
    detecting an interface zone between the amount of hydrogen gas and the amount of lubricant; and
    passing a portion of the amount of lubricant into a first end portion of a drain line, the first end portion of the drain line being spaced below the interface zone.

11. The method of claim 10, further comprising:
    opening a control valve fluidly connected to the drain line based on the position of the interface zone relative to the first end portion.

12. The method of claim 11, further comprising:
    proportionally opening the control valve to maintain the interface zone a predetermined distance above the first end portion.

13. The method of claim 10, further comprising:
    passing another portion of the lubricant through a first end of a standpipe that extends into the hydrogen detraining tank above the first end portion of the drain line.

14. The method of claim 13, further comprising:
passing the another portion of the lubricant though a fluid trap fluidly connected to the standpipe.

15. A lubricant drain system for a hydrogen cooled generator, the lubricant system comprising:
a drain conduit having a first end section that extends to a second end section, the first end section being fluidly coupled to the hydrogen cooled generator;
a hydrogen detraining tank fluidly coupled to the second end section of the drain conduit, the hydrogen detraining tank including a body portion having an external surface and an internal surface that defines a hollow interior portion, the hydrogen detraining tank being configured and disposed to separate hydrogen gas coolant entrained in a lubricant passing from the drain conduit;
a sensor operatively mounted in the hydrogen detraining tank, the sensor being configured and disposed to detect an interface zone between an amount of lubricant and an amount of hydrogen gas in the hollow interior portion;
a drain line fluidly coupled to the hydrogen detraining tank, the drain line having a first end portion that is exposed in the hollow interior portion and a second end portion;
a valve mounted in the drain line between the first and second end portions, the valve being configured to control fluid flow through the drain line; and
a controller operatively connected to the sensor and the valve, the controller being configured and disposed to selectively open the valve allowing a portion of the amount of lubricant to flow from the hollow interior portion when the interface zone is a predetermined distance above the first end portion of the drain line.

16. The lubricant drain system according to claim 15, wherein the sensor is a fluid level transmitter.

17. The lubricant drain system according to claim 15, further comprising: a standpipe having a first end that extends to a second end, the first end extending into the hollow interior portion above the first end portion, wherein the controller selectively opens the valve when the interface zone is at the predetermined distance above the first end portion of the drain line and below the first end of the stand pipe.

18. The lubricant drain system according to claim 17, further comprising: a fluid trap fluidly connected to the second end of the standpipe.

19. The lubricant system according to claim 18, wherein the first hydrogen detraining tank includes a first stand pipe having a first end and a second end, the first end extending into the hollow interior portion above the first end portion, and the second hydrogen detraining tank includes a second stand pipe having a first end and a second end, the first end extending into the hollow interior portion above the first end portion.

20. The lubricant drain system according to claim 15, further comprising: another hydrogen detraining tank, the hydrogen detraining tank and the another hydrogen detraining tank being physically joined.

* * * * *